United States Patent
Chen et al.

(10) Patent No.: US 8,122,636 B2
(45) Date of Patent: Feb. 28, 2012

(54) **METHOD FOR INCUBATING FRUITING BODIES OF *ANTRODIA CINNAMOMEA***

(75) Inventors: Chien-Ming Chen, Nanton County (TW); Hsiu-Wen Huang, Nanton County (TW)

(73) Assignee: Endemic Species Research Insititue, C.O.A., Nanton County (TW)

( * ) Notice: Subject to any disclaimer, the term of this patent is extended or adjusted under 35 U.S.C. 154(b) by 236 days.

(21) Appl. No.: 12/718,463

(22) Filed: Mar. 5, 2010

(65) Prior Publication Data
US 2011/0126456 A1 Jun. 2, 2011

(30) Foreign Application Priority Data
Dec. 2, 2009 (TW) ................................ 98141224 A

(51) Int. Cl.
*A01G 1/04* (2006.01)
(52) U.S. Cl. ...................................... 47/1.1; 435/256.8
(58) Field of Classification Search ................. 424/93.5, 424/195; 435/254.1, 256.8, 410; 47/1.1, 47/59 S
See application file for complete search history.

(56) References Cited

U.S. PATENT DOCUMENTS

| | | | | |
|---|---|---|---|---|
| 4,127,965 | A * | 12/1978 | Mee | 47/1.1 |
| PP8,684 | P * | 4/1994 | Smalley et al. | |
| 5,681,738 | A * | 10/1997 | Beelman et al. | 435/254.1 |
| 6,173,525 | B1 * | 1/2001 | Danell | 47/1.1 |
| 6,355,475 | B1 * | 3/2002 | Huang et al. | 435/256.8 |
| 6,740,517 | B2 * | 5/2004 | Lan et al. | 435/254.3 |
| 2006/0251673 | A1 * | 11/2006 | Hwang et al. | 424/195.15 |
| 2008/0102512 | A1 * | 5/2008 | Tsai | 435/256.8 |
| 2008/0213394 | A1 * | 9/2008 | Tullo et al. | 424/618 |
| 2009/0025286 | A1 * | 1/2009 | Kawai et al. | 47/1.1 |
| 2009/0145023 | A1 * | 6/2009 | Huang et al. | 47/1.1 |

* cited by examiner

*Primary Examiner* — Timothy Collins
*Assistant Examiner* — Joshua Huson
(74) *Attorney, Agent, or Firm* — Kirton McConkie; Evan R. Witt

(57) ABSTRACT

A method for incubating fruiting bodies of *Antrodia cinnamomea* is disclosed. The method comprises steps of: (a) obtaining a hymenium slice from a fruiting body of *Antrodia cinnamomea*; (b) transferring the hymenium slice to a selective culture medium for incubation to obtain an isolated strain; (c) transferring the isolated strain to a bagasse culture medium for incubation; (d) subjecting proliferation by liquid culture or solid culture to obtain large-scale liquid spawn or solid spawn; (e) inoculating a wood segment with the liquid spawn or the solid spawn and subjecting incubation; and (f) re-inoculating the wood segment with mixed single-spore colonies of *Antrodia cinnamomea* and subjecting incubation until fruiting bodies are produced.

12 Claims, 1 Drawing Sheet

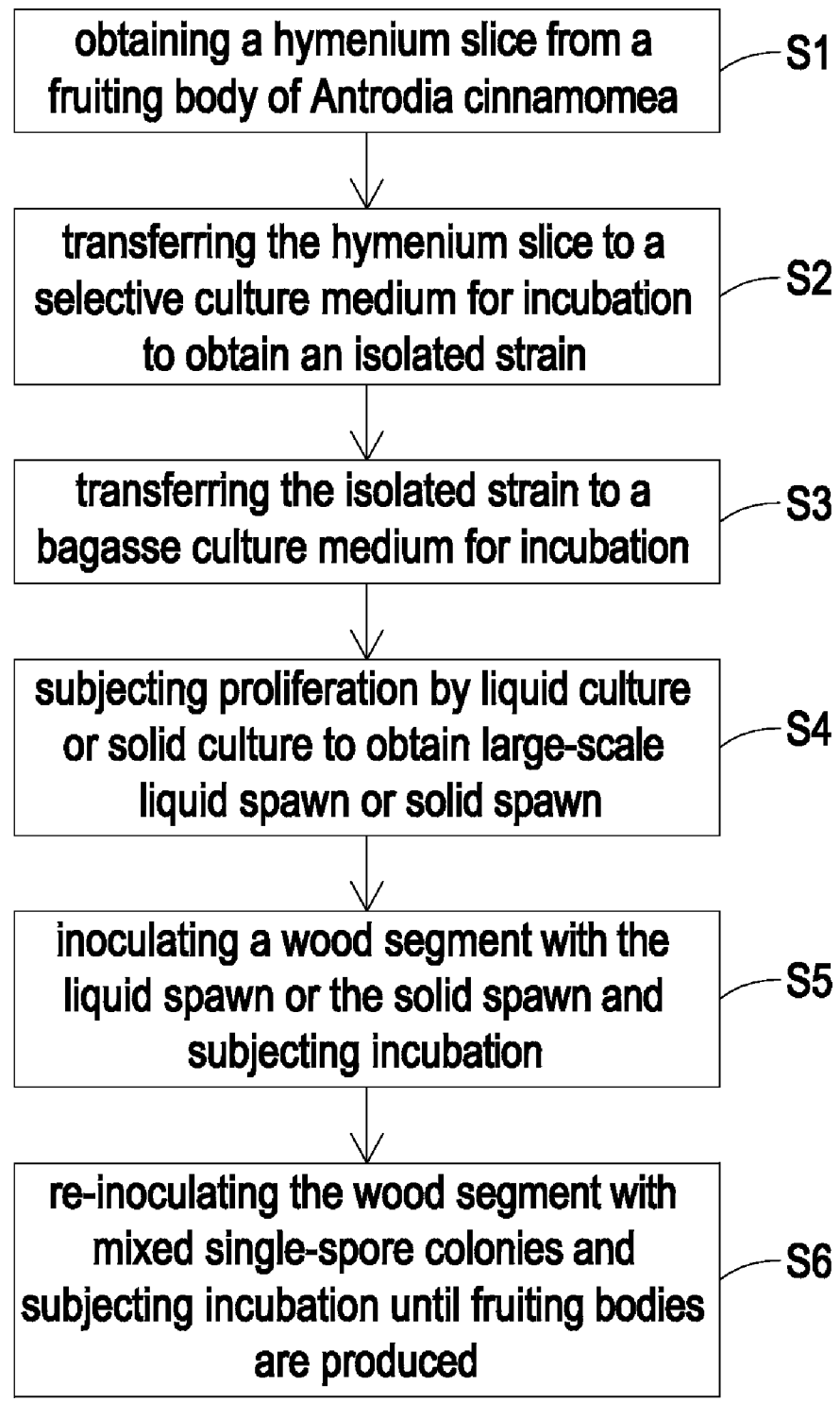

METHOD FOR INCUBATING FRUITING BODIES OF *ANTRODIA CINNAMOMEA*

FIELD OF THE INVENTION

The present invention relates to a method for incubating fruiting bodies of *Antrodia cinnamomea*, and more particularly to a method for incubating fruiting bodies of *Antrodia cinnamomea* on a wood segment.

BACKGROUND OF THE INVENTION

*Antrodia cinnamomea* is a fungus species indigenous to Taiwan and only parasites in the hollow trunk of *Cinnamomum micranthum* (Hayata) Hayata (also called *Cinnamomum kanehirai* Hayata) in Taiwan. Since it is commonly considered that *Antrodia cinnamomea* has effects on cancer treatment and detoxification for pesticide poisoning, it is widely used as health food. The source of *Antrodia cinnamomea* generally comes from the fruiting bodies of wild *Antrodia cinnamomea* or the mycelia of *Antrodia cinnamomea* incubated in liquid culture. Recently, solid culture is also developed for incubating *Antrodia cinnamomea* so as to obtain fermentative products of *Antrodia cinnamomea* containing triterpenoids, polysaccharides and anti-oxidants. However, the effects of these products are not good as those from wild *Antrodia cinnamomea*.

There are some problems that need to be solved for the industry of *Antrodia cinnamomea* fruiting body. First, the supply of the fruiting bodies of the wild *Antrodia cinnamomea* is unable to meet the demand of the market, so the price thereof has rapidly increased in these few years. Besides, most of the fruiting bodies available in the market are annual thin fruiting bodies, and the perennial thick fruiting bodies are very rare and expensive, for example, the middle class products of the fruiting bodies cost 150,000 TWD per kilogram. As a result, plenty of fake products appear in the market and it's not easy for people to purchase the real and high quality product. Moreover, some forestry problems are derived since the woods of *Cinnamomum micranthum* (Hayata) Hayata are illegally lumbered and the by-products of the forest are stolen by people.

In addition, the wood segments of *Cinnamomum micranthum* (Hayata) Hayata which are not inoculated with *Antrodia cinnamomea* yet are over 2,000 ton, but the inoculation technique costs 80,000-100,000 TWD per ton, which is very expensive and still not a mature technique. On the other hand, since the wild *Antrodia cinnamomea* is host-specific to *Cinnamomum micranthum* (Hayata) Hayata when infecting the wood segment, if the technique for incubating fruiting bodies of *Antrodia cinnamomea* on the wood segments other than *Cinnamomum micranthum* (Hayata) Hayata can be developed, there will be a huge market potential.

Therefore, to overcome the problems described above, the inoculation technique needs to be improved so as to artificially incubate large-scale fruiting bodies of *Antrodia cinnamomea*.

SUMMARY OF THE INVENTION

An object of the present invention is to provide a method for incubating fruiting bodies of *Antrodia cinnamomea*. The method is able to isolate the *Antrodia cinnamomea* strain from a wild *Antrodia cinnamomea* and inoculate the *Antrodia cinnamomea* strain on a wood segment. Further, by means of re-inoculating the wood segment with mixed single-spore colonies, the fruiting rate of *Antrodia cinnamomea* can be increased.

According to an aspect of the present invention, there is provided a method for incubating fruiting bodies of *Antrodia cinnamomea*. The method comprises steps of: (a) obtaining a hymenium slice from a fruiting body of *Antrodia cinnamomea*; (b) transferring the hymenium slice to a selective culture medium for incubation to obtain an isolated strain; (c) transferring the isolated strain to a bagasse culture medium for incubation; (d) subjecting proliferation by liquid culture or solid culture to obtain large-scale liquid spawn or solid spawn; (e) inoculating a wood segment with the liquid spawn or the solid spawn and subjecting incubation; and (f) re-inoculating the wood segment with mixed single-spore colonies of *Antrodia cinnamomea* and subjecting incubation until fruiting bodies are produced.

In an embodiment, the selective culture medium includes antibiotics and camphor oil, and a concentration of the camphor oil is 0.15-0.3% (vol/vol).

In an embodiment, the bagasse culture medium includes 1-3% (wt/vol) malt extract, 5-20% (wt/vol) bagasse and 0.25-0.7% (vol/vol) camphor oil.

For the liquid culture in step (d), *Antrodia cinnamomea* strain in the bagasse culture medium of step (c) is transferred to a liquid medium and subjected incubation, wherein the liquid medium includes 1-3% (wt/vol) malt extract and 0.5-1% (wt/vol) citric acid. Besides, during the liquid culture, an air pump is provided to pump air into an incubation container for the liquid culture.

For the solid culture in step (d), *Antrodia cinnamomea* strain in the bagasse culture medium of step (c) is inoculated into a culture bag for bag cultivation.

In an embodiment, the wood segment is selected from Lauraceae, Fagaceae or Taxodiaceae, and Lauraceae includes *Cinnamomum micranthum* (Hayata) Hayata and *Cinnamomum camphora* (L.) Presl.

In an embodiment, the wood segment is pre-treated before inoculation to plane surfaces of the wood segment for removing old and rotten wood.

In an embodiment, the single-spore colonies are isolated by the selective culture medium.

In an embodiment, step (f) further comprises steps of: (f1) scraping mycelia of the single-spore colonies from the selective culture medium and subjecting proliferation to obtain spawn of the mixed single-spore colonies; and (f2) spraying or smearing the spawn of the mixed single-spore colonies on the wood segment that has been inoculated with the liquid spawn or the solid spawn and incubated for 7-30 days in step (e) by a spray gun or a brush.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1 shows the flowchart of the method for incubating fruiting bodies of *Antrodia cinnamomea* according to the preferred embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

The present invention relates to a method for incubating fruiting bodies of *Antrodia cinnamomea*. As shown in the flowchart of FIG. 1, the method for incubating fruiting bodies of *Antrodia cinnamomea* includes steps of: (a) obtaining a hymenium slice from a fruiting body of *Antrodia cinnamomea* (Step S1); (b) transferring the hymenium slice to a selective culture medium for incubation to obtain an isolated strain (Step S2); (c) transferring the isolated strain to a bagasse culture medium for incubation (Step S3); (d) subjecting proliferation by liquid culture or solid culture to obtain large-scale liquid spawn or solid spawn (Step S4); (e) inoculating a wood segment with the liquid spawn or the solid spawn and subjecting incubation (Step S5); and (f) re-inoculating the wood segment with mixed single-spore colonies of *Antrodia cinnamomea* and subjecting incubation until fruiting bodies are produced (Step S6). The detailed steps are illustrated as follows.

Step S1: Obtaining a Hymenium Slice from a Fruiting Body of *Antrodia cinnamomea*

First, a wild strain of *Antrodia cinnamomea* grown on the wood of *Cinnamomum micranthum* (Hayata) Hayata is used as the source for incubating fruiting bodies of *Antrodia cinnamomea*. A hymenium slice is obtained by transversely cutting the fruiting body of *Antrodia cinnamomea* with a knife to get a thin slice of hymenium layer having a size of 0.5-1 cm×0.1-0.5 cm (length×width).

Step S2: Transferring the Hymenium Slice to a Selective Culture Medium for Incubation to Obtain an Isolated Strain Next, the isolation and purification of *Antrodia cinnamomea* is further proceeded. The hymenium slice obtained from Step S1 is transferred and placed in the center of a selective culture medium. After incubation at 20-25° C. for 10-20 days, the orange-red dikaryotic mycelia are grown around the hymenium in the center of the selective culture medium. Besides, there are different colored orange-red single-spore colonies grown in the suburbs on the selective culture medium, in which the single-spore colonies are derived from the basidiospores which are ejected from the hymenium. Meanwhile, there are also some white single-spore colonies grown on the selective culture medium.

In an embodiment, the selective culture medium is first prepared by dissolving agar and malt extract into water, wherein the concentrations of the agar and the malt extract are 1.5-2.0% (wt/vol) and 1-3% (wt/vol), respectively. After autoclave sterilization, the above solution is cooled to 40-50° C. and then added with antibiotics and camphor oil. After well-mixed, the solution is poured into the desired petri dishes for cooling and solidification, so as to obtain the selective culture mediums. The antibiotics are used to inhibit the growth of bacteria, and include penicillin antibiotics, such as ampicillin and penicillin G, but not limited thereto. The camphor oil is used to inhibit the growth of fungi, such as watermold, *Trichoderma* spp and *Penicillium* spp, but not inhibit the growth of the *Antrodia cinnamomea*.

For example, the selective culture medium includes 100-200 ppm ampicillin, 100-200 ppm penicillin G, and 0.15-0.3% (vol/vol) camphor oil, but not limited thereto.

For further purifying the strain, the orange-red dikaryotic mycelia grown around the hymenium in the center of the selective culture medium can be further cultured on the selective culture medium repeatedly. The dikaryotic mycelia purified from this step have better survival rate and are able to grow rapidly, which are suitable to be first inoculated on a wood segment.

Alternatively, the different colored orange-red single-spore colonies grown in the suburbs on the selective culture medium can also be picked for dual culture to increase the genetic diversity. For example, white colonies may be obtained from the orange-red fruiting body.

Step S3: Transferring the Isolated Strain to a Bagasse Culture Medium for Incubation The isolated agar strain obtained from Step S2 by means of the selective culture medium is transferred to a sterilized bagasse culture medium in a culture flask, and incubated at room temperature for 20-40 days to obtain the fungi strain for proliferation.

In an embodiment, the bagasse culture medium is first prepared by dissolving malt extract into water, wherein the concentration of the malt extract is 1-3% (wt/vol), and then added with bagasse and camphor oil. Preferably, the bagasse culture medium includes 1-3% (wt/vol) malt extract, 5-20% (wt/vol) bagasse and 0.25-0.7% (vol/vol) camphor oil.

This step is to further eliminate the contamination of *Trichoderma* spp. Since *Trichoderma* spp easily produces spores in bagasse culture medium and appears as dark green colonies, the contamination of *Trichoderma* spp can be observed by naked eye so as to discard the flask contaminated with *Trichoderma* spp.

Step S4: Subjecting Proliferation by Liquid Culture or Solid Culture to Obtain Large-Scale Liquid Spawn or Solid Spawn Since the wood segment has a big volume, it needs large amount of spawn to be inoculated on the wood segment. Therefore, the *Antrodia cinnamomea* strain obtained from Step S3 has to be further proliferated by either liquid culture or solid culture.

With respect to liquid culture, the *Antrodia cinnamomea* strain in the bagasse culture medium obtained from Step S3 is transferred to a sterilized liquid medium and subjected incubation so as to obtain large-scale liquid spawn used to be inoculated on the wood segment.

In an embodiment, the liquid medium includes 1-3% (wt/vol) malt extract and 0.5-1% (wt/vol) citric acid. The citric acid is used inhibit the growth of bacteria, such as *Bacillus* spp, but not inhibit the growth of the *Antrodia cinnamomea*.

The liquid culture can be divided into two stages. In the first stage, the *Antrodia cinnamomea* strain in the bagasse culture medium obtained from Step S3 is transferred to a flask containing 50-250 ml of liquid medium and then incubated at room temperature in a static condition or in a shaker for 7 days. In the second stage, the incubation solution of the first stage is transferred to a serum bottle containing the liquid medium and having a capacity of 0.5-5 liter. Air is pumped into the serum bottle by an air pump and filtered by a 0.2 μm filter, and a dual tube ventilation device is provided on the cap of the serum bottle. Since *Antrodia cinnamomea* is an aerobic fungus, pumping air into the serum bottle can improve the rapid growth of *Antrodia cinnamomea*. After incubation for 7-14 days with air pumping, large-scale liquid spawn is produced and ready to be inoculated on the wood segment.

On the other hand, the *Antrodia cinnamomea* strain can also be proliferated by solid culture, that is, to transfer the *Antrodia cinnamomea* strain in the bagasse culture medium obtained from Step S3 to a culture bag for bag cultivation.

In an embodiment, the opening portion of the culture bag is compactly filled with high-density sponge, and the exterior of the opening portion is tied with the rubber band. The opening portion of the culture bag is served as air filtering and flowing channel to provide air which is essential to mycelia metabolism. The half capacity of the culture bag is occupied by the substrates for mycelia growth, and a space is preserved for mixing the substrates and the *Antrodia cinnamomea* strain.

After the culture bag is sterilized and the substrates in the culture bag are cooled to the room temperature, the sponge is taken out from the opening portion of the culture bag so as to inoculate the *Antrodia cinnamomea* strain onto the surfaces of the substrates in the culture bag, and then, the sponge is put back to the opening portion of the culture bag and fixed by the rubber band.

Subsequently, the *Antrodia cinnamomea* strain and the substrates in the culture bag are well mixed and then incubated at room temperature. When the mycelia of *Antrodia cinnamomea* are wound around the substrates or the surfaces of the substrates are fully occupied by the mycelia, the solid spawn is ready to be inoculated on the wood segment.

Step S5: Inoculating a Wood Segment with the Liquid Spawn or the Solid Spawn and Subjecting Incubation The large-scale liquid spawn or solid spawn obtained from Step S4 is further inoculated on the wood segment in this step, and the wood segment used for inoculation with *Antrodia cinnamomea* can be selected from Lauraceae, Fagaceae or Taxodiaceae, and Lauraceae includes *Cinnamomum micranthum* (Hayata) Hayata and *Cinnamomum camphora* (L.) Presl.

The wood segment used for inoculation cannot be immersed in water and needs to be pre-treated. The pre-treatment is to plane the surfaces of the wood segment by a planer tool or a brushing machine, so as to remove the old and rotten wood and eliminate bacteria or fungi remaining in the wood, which are not easy to be killed by sterilization and will compete for the growth space with the inoculated *Antrodia cinnamomea*. Afterward, the wood segment is sterilized at the temperature above 100° C. for 2 hours. After the wood segment is cooled down, it is immersed in the sterilized water at room temperature for 5-10 minutes. Next, the water is drained away from the wood segment, which is then ready to be inoculated.

When inoculated with the liquid spawn, the pre-treated wood segment is immersed in the liquid spawn obtained from Step S4 immediately, so that the liquid spawn can be adhered to the surfaces of the wood segment. Then the wood segment is covered by a plastic bag and incubated at room temperature for 7-30 days.

Except inoculated with the liquid spawn, the wood segment can also be inoculated with the solid spawn. When inoculated with the solid spawn, the substrates in the culture bag full of the mycelia are taken out and directly smeared on the surfaces of the wood segment. Alternative way is to add 150 g of the substrates having the mycelia fully grown thereon into one liter of sterilized water, and then the resulted solution is mixed with 15 g of methyl cellulose and blended into a cream mixture. The cream mixture is smeared on the surfaces of the wood segment by a brush. After the wood segment is inoculated with the solid spawn, the wood segment is covered by a plastic bag and incubated at room temperature for 7-30 days.

Step S6: Re-Inoculating the Wood Segment with Mixed Single-Spore Colonies of *Antrodia cinnamomea* and Subjecting Incubation Until Fruiting Bodies are Produced To improve the fruiting rate of *Antrodia cinnamomea*, the present invention utilizes a re-inoculation technique, which is to re-inoculate the wood segment that has been inoculated with the liquid spawn or the solid spawn and incubated for 7-30 days with mixed single-spore colonies. The single-spore colonies are preferably the multiple single-spore colonies grown on the selective culture medium and isolated from the fruiting bodies of *Antrodia cinnamomea* originated from different areas or grown on different wood segments. Also, the single-spore colonies can be the different colored single-spore colonies grown in the suburbs on the selective culture medium of Step S2, which are derived from the basidiospores ejected from the hymenium.

Before inoculation, the mycelia of the multiple single-spore colonies on the selective culture medium are scraped and subjected proliferation to obtain the spawn of the mixed single-spore colonies. For example, the scraped mycelia are incubated in the sterilized liquid medium with air pumping for 7-14 days, or subjected proliferation by liquid culture or solid culture as described in Step S4. Then, the spawn of the mixed single-spore colonies is sprayed or smeared on the wood segment that has been inoculated with the liquid spawn or the solid spawn and incubated for 7-30 days in Step S5 by a spray gun or a brush. Afterward, the wood segment is covered by a plastic bag and incubated at room temperature for 7-14 days, and then the plastic bag is opened and the wood segment is continuously incubated until the fruiting bodies are produced, wherein the fruiting body means the body already has the basidia and basidiospores when examined under the microscope.

In conclusion, the present invention provides a method for incubating fruiting bodies of *Antrodia cinnamomea*. First, the hymenium slice obtained from the fruiting body of a wild strain of *Antrodia cinnamomea* is incubated in the selective culture medium. The camphor oil contained in the selective culture medium can inhibit the growth of fungi, such as water-mold, *Trichoderma* spp and *Penicillium* spp, but not inhibit the growth of the *Antrodia cinnamomea*. Later, the *Antrodia cinnamomea* strain is incubated in the bagasse culture medium to further eliminate the contamination of *Trichoderma* spp since *Trichoderma* spp easily produces spores in bagasse culture medium and appears as dark green colonies that can be observed by naked eye. After the proliferation by liquid culture or solid culture, the spawn is inoculated on the wood segment. In this step, the inoculated liquid spawn or solid spawn is dikaryotic mycelia, which have better survival rate and are able to grow rapidly, so the mycelia can grow well on the wood segment and get colonized on the surfaces of the wood segment to prevent the growth of other bacteria or fungi. Moreover, since the sexual pattern of *Antrodia cinnamomea* is heterothallic tetrapolar, the present invention utilizes a re-inoculation technique to increase the mating ratio. Particularly, the wood segment that has been inoculated with the liquid spawn or the solid spawn and incubated for 7-30 days is further re-inoculated with mixed single-spore colonies, and this technique increases the inbreeding or mating ratio between monokaryotic mycelia, which facilitates the formation of dikaryotic mycelia so as to produce the fruiting bodies. In addition, there is affinity between the monokaryotic mycelia and the dikaryotic mycelia, wherein the monokaryotic mycelia are subjected dikaryotization by the dikaryotic mycelia, and this also increases the fruiting rate. Therefore, by the technique provided in the present invention, the fruiting bodies of the *Antrodia cinnamomea* can be artificially incubated on the wood segment, which has a huge market potential.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for incubating fruiting bodies of *Antrodia cinnamomea*, comprising steps of:
   (a) obtaining a hymenium slice from a fruiting body of *Antrodia cinnamomea*,
   (b) transferring the hymenium slice to a selective culture medium for incubation to obtain an isolated strain;
   (c) transferring the isolated strain to a bagasse culture medium for incubation;
   (d) subjecting proliferation by liquid culture or solid culture to obtain large-scale liquid spawn or solid spawn;
   (e) inoculating a wood segment with the liquid spawn or the solid spawn and subjecting to incubation; and
   (f) re-inoculating the wood segment with mixed single-spore colonies of *Antrodia cinnamomea* and subjecting to incubation until fruiting bodies are produced.

2. The method for incubating fruiting bodies of *Antrodia cinnamomea* according to claim 1 wherein the selective culture medium includes antibiotics and camphor oil.

3. The method for incubating fruiting bodies of *Antrodia cinnamomea* according to claim 2 wherein a concentration of the camphor oil is 0.15-0.3% (vol/vol).

4. The method for incubating fruiting bodies of *Antrodia cinnamomea* according to claim 1 wherein the bagasse culture medium includes 1-3% (wt/vol) malt extract, 5-20% (wt/vol) bagasse and 0.25-0.7% (vol/vol) camphor oil.

5. The method for incubating fruiting bodies of *Antrodia cinnamomea* according to claim 1 wherein for the liquid culture in step (d), *Antrodia cinnamomea* strain in the bagasse culture medium of step (c) is transferred to a liquid medium and subjected to incubation.

6. The method for incubating fruiting bodies of *Antrodia cinnamomea* according to claim 5 wherein the liquid medium includes 1-3% (wt/vol) malt extract and 0.5-1% (wt/vol) citric acid.

7. The method for incubating fruiting bodies of *Antrodia cinnamomea* according to claim 1 wherein during the liquid culture in step (d), an air pump is provided to pump air into an incubation container for the liquid culture.

8. The method for incubating fruiting bodies of *Antrodia cinnamomea* according to claim 1 wherein for the solid culture in step (d), *Antrodia cinnamomea* strain in the bagasse culture medium of step (c) is inoculated into a culture bag for bag cultivation.

9. The method for incubating fruiting bodies of *Antrodia cinnamomea* according to claim 1 wherein the wood segment is selected from Lauraceae, Fagaceae or Taxodiaceae, and Lauraceae includes *Cinnamomum micranthum* (Hayata) Hayata and *Cinnamomum camphora* (L.) Pres1.

10. The method for incubating fruiting bodies of *Antrodia cinnamomea* according to claim 1 wherein before inoculation, the wood segment is pre-treated to plane surfaces of the wood segment for removing old and rotten wood.

11. The method for incubating fruiting bodies of *Antrodia cinnamomea* according to claim 1 wherein the single-spore colonies are isolated by the selective culture medium.

12. The method for incubating fruiting bodies of *Antrodia cinnamomea* according to claim 11 wherein step (f) further comprises steps of:
   (f1) scraping mycelia of the single-spore colonies from the selective culture medium and subjecting proliferation to obtain spawn of the mixed single-spore colonies; and
   (f2) spraying or smearing the spawn of the mixed single-spore colonies on the wood segment that has been inoculated with the liquid spawn or the solid spawn and incubated for 7-30 days in step (e) by a spray gun or a brush.

\* \* \* \* \*